(12) United States Patent
Botez

(10) Patent No.: US 8,435,145 B2
(45) Date of Patent: May 7, 2013

(54) RANDOMIZED CHAIN SPROCKET AND METHOD FOR MAKING A SPROCKET

(75) Inventor: Lucian Botez, Novi, MI (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 13/595,429

(22) Filed: Aug. 27, 2012

(65) Prior Publication Data

US 2012/0317812 A1    Dec. 20, 2012

Related U.S. Application Data

(62) Division of application No. 12/700,906, filed on Feb. 5, 2010, now Pat. No. 8,328,671.

(60) Provisional application No. 61/150,473, filed on Feb. 6, 2009.

(51) Int. Cl.
*F16H 7/06* (2006.01)
*F16H 55/30* (2006.01)
*F16H 7/00* (2006.01)
*B21D 53/28* (2006.01)
*B21K 1/30* (2006.01)
*B23P 15/14* (2006.01)

(52) U.S. Cl.
USPC ............. 474/156; 474/152; 474/153; 29/893

(58) Field of Classification Search .................. 474/152, 474/153, 155, 156; 29/893; 703/1
See application file for complete search history.

(56) References Cited

U.S. PATENT DOCUMENTS

| | | | |
|---|---|---|---|
| 6,325,734 B1* | 12/2001 | Young | 474/202 |
| 7,654,925 B2* | 2/2010 | Todd | 474/152 |
| 7,699,733 B2* | 4/2010 | Sakura et al. | 474/161 |
| 2002/0132689 A1* | 9/2002 | Young | 474/156 |
| 2003/0087714 A1* | 5/2003 | Todd | 474/156 |
| 2004/0185977 A1* | 9/2004 | Young et al. | 474/202 |
| 2006/0135304 A1* | 6/2006 | Sonoda | 474/152 |
| 2007/0087878 A1* | 4/2007 | Ogawa et al. | 474/156 |

* cited by examiner

*Primary Examiner* — William A Rivera
*Assistant Examiner* — Henry Liu
(74) *Attorney, Agent, or Firm* — Lucas & Mercanti, LLP

(57) ABSTRACT

A randomized chain sprocket has a set of four tooth gaps having three different tooth gap radial locations, two different link angles, and a chain with constant link pitch.

5 Claims, 7 Drawing Sheets

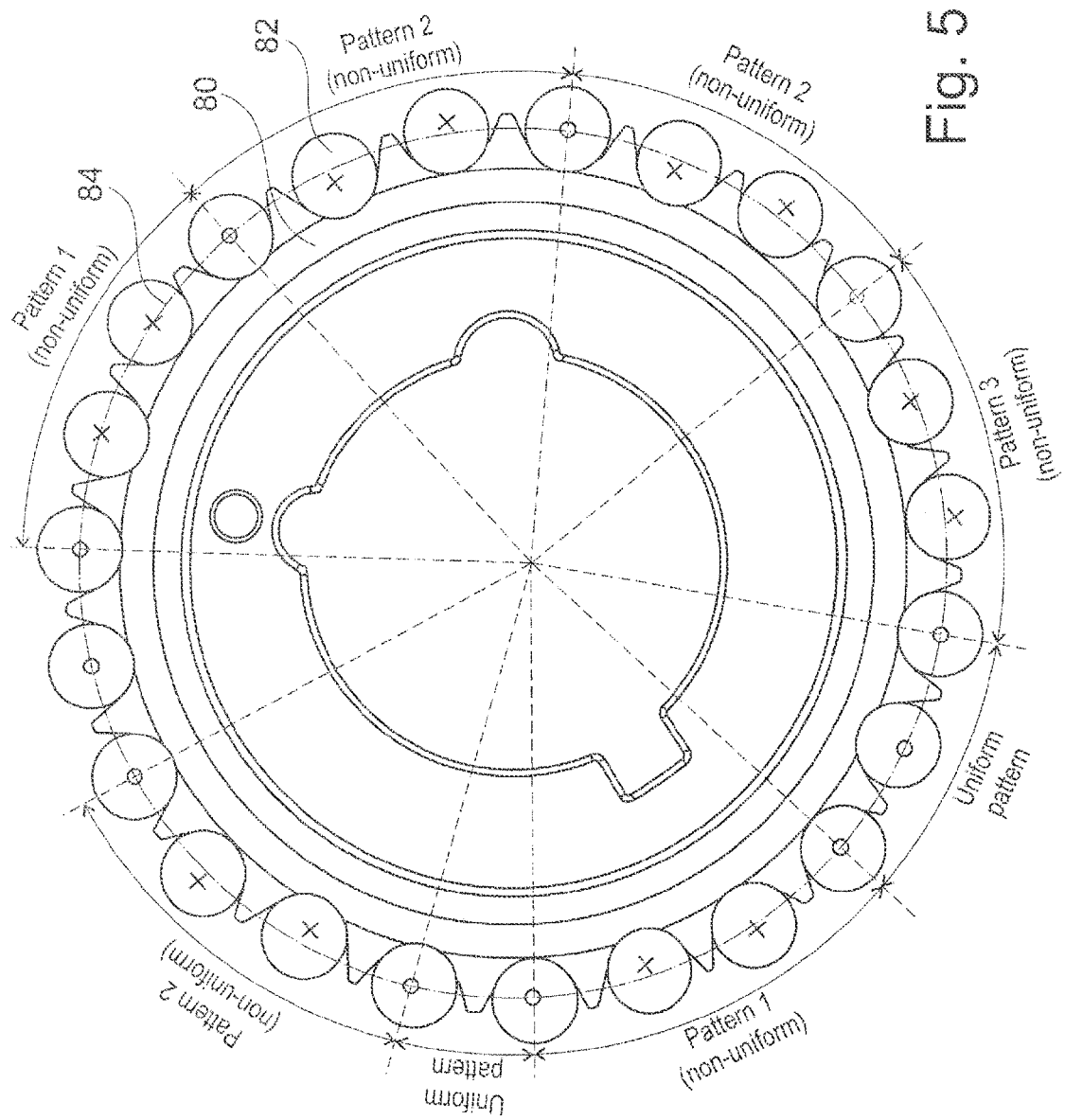

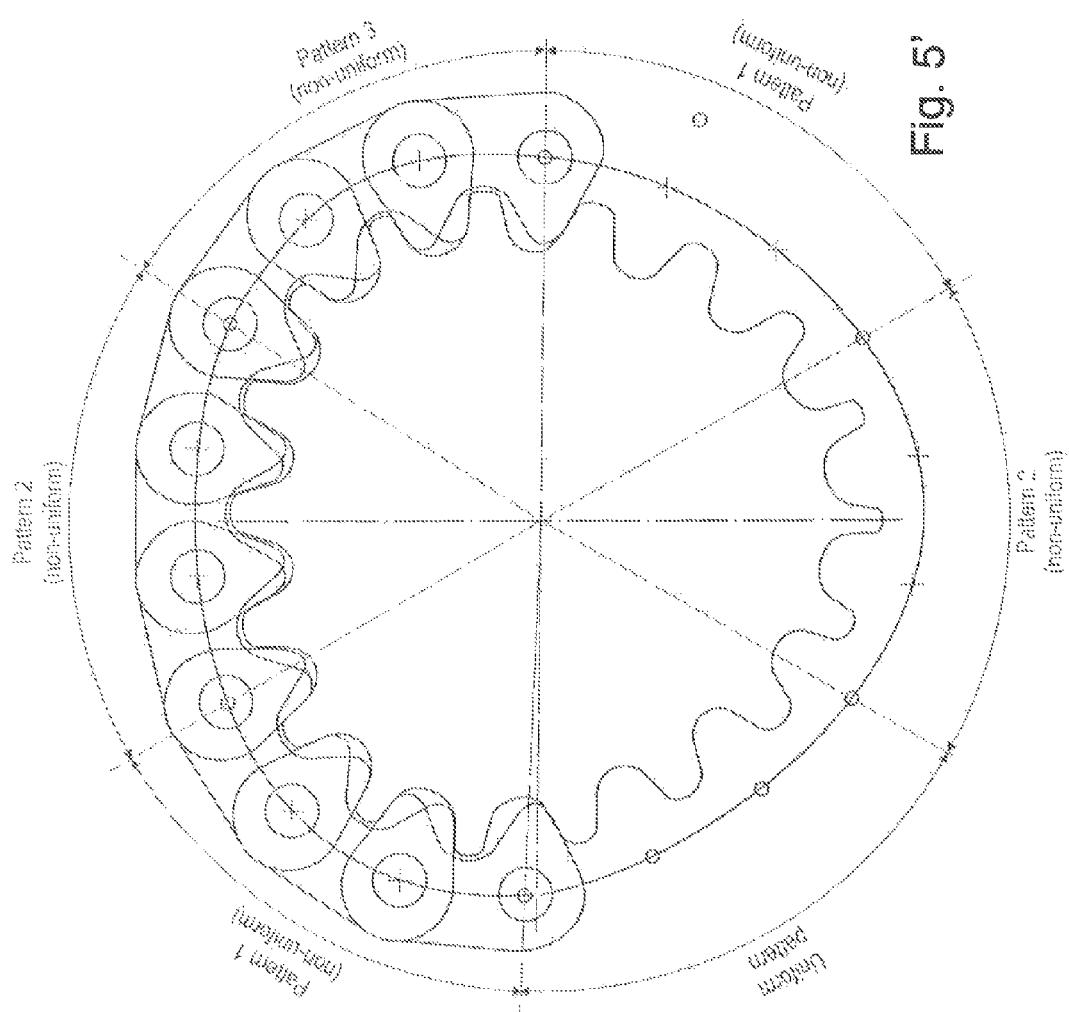

RANDOMIZED CHAIN SPROCKET AND METHOD FOR MAKING A SPROCKET

CROSS REFERENCE TO RELATED APPLICATIONS

This application is a divisional of U.S. Ser. No. 12/700,906 filed Feb. 5, 2010 which claims the benefit of U.S. Provisional Application 61/150,473 filed Feb. 6, 2009 which Applications are incorporated by reference herein

FIELD OF THE INVENTION

The invention relates to chain and sprocket drives, and more particularly, to a sprocket having reduced noise and vibrations.

BACKGROUND OF THE INVENTION

Internal combustion engines use timing chain drive systems which comprise a chain and sprockets. Example chain configurations known in the art include; inverted teeth (IT) chains, bush chains and roller chains. Due to the impact of the chain on the sprocket during meshing, the chain generates vibration and noise. Due to the uniform distribution of the sprocket teeth along the sprocket perimeter, vibration and noises occur at fundamental meshing frequency and this frequency is in positive integer multiples. The fundamental meshing frequency for a single loop timing chain in Hertz is given by the formula:

$$V=(n_{engine}/60) \times z_{crank}$$

wherein $n_{engine}$ is the engine angular velocity in rpm and $z_{crank}$ is the crankshaft sprocket number of teeth.

Conventionally, in order to reduce noise and vibration, the uniform teeth distribution of the sprocket teeth around the sprocket perimeter is altered and hence the time interval between two consecutive impacts are unequal. This breaks the uniform pattern and hence the noise and vibrations are spread around a broader spectrum of frequencies while the amplitude of the meshing orders are decreased and eventually masked by the engine noise generated by source other than the chain meshing. An attenuation of the unpleasant meshing pure tones is expected but not necessarily a decrease of the overall noise and vibration level.

SUMMARY OF THE INVENTION

The invention provides a chain and sprocket drive system using a chain with a constant pitch and a sprocket wherein some of the adjacent tooth gaps have different tooth gap radial locations. This provides a construction with reduced noise and vibration. In an embodiment using a roller chain, by varying the root radial locations of some of the adjacent roots, the time interval between contact of the roller and the sprocket is varied and hence the uniform pattern is broken.

Specifically, a set of four consecutive roots is employed where the middle two roots have different root radial locations than the other two roots. Preferably, the four consecutive roots have at least two different link angles.

One method for making the sprocket comprises forming a circle defined by the pitch radius of the sprocket; forming a polygon having sides which are equal to the chain pitch inside the circle; and then changing the shape of the polygon while maintaining the length of the sides of the polygon in order to arrive at different link angles.

A preferred method for making the sprocket comprises forming a trapezoid with a base having a length equal to the distance between a center of a pin in a first tooth gap and a center of a pin in a fourth tooth gap of a set of four consecutive tooth gaps, the top and legs of the trapezoid having a length equal to the chain pitch; changing the shape of the trapezoid while maintaining the length of the sides of the trapezoid; and determining a tooth gap radial location for each tooth gap of the set of four consecutive tooth gaps based on assigning each vertex of the changed trapezoid as the center of a pin positioned in one of the tooth gaps of the set of four consecutive tooth gaps.

Broadly, the chain and sprocket drive of the invention include: a chain having pins interconnected by links, each of the pins having a central axis and a chain pitch defined as a distance between the central axis of adjacent pins, the chain pitch being constant. The chain configuration includes, but is not limited to, roller chains, bush chains and inverted teeth (IT) chains. A sprocket having teeth and tooth gaps is spaced about the periphery of the sprocket, one of each of the tooth gaps is located between adjacent teeth for receiving one of the rollers bushes or link teeth. Each of the tooth gaps has a tooth gap radial location defined as a distance between the center of the sprocket and a point located to the chain pin center of a fully seated link in a radial direction. At least one set of four consecutive tooth gaps is defined as a first tooth gap, a second tooth gap, a third tooth gap and a fourth tooth gap. The first tooth gap and the fourth tooth gap have the same tooth gap radial location, and the second tooth gap and the tooth gap root have a different tooth gap radial location from each other and from the firs and the fourth root.

In one embodiment, the set of four consecutive tooth gaps has two different link angles, a first link angle defined by an angle between a first link center line and a second link center line and the second link angle defined as an angle between the second link center line and a third link center line. The first link center line is defined by the central axis of a pin in the first tooth gap and the central axis of a pin in the second tooth gap. The second link center line is defined by the central axis of a pin in the second tooth gap and the central axis of a pin in the third tooth gap. The third link center line is defined by the central axis of a pin in the third tooth gap and the central axis of a pin in the fourth tooth gap.

One method of the invention for making a sprocket with reduced noise and vibration for a chain and sprocket drive broadly includes: selecting a uniform chain having pins interconnected by links, each of the pins having a central axis and a chain pitch defined as a distance between the central axis of adjacent pins, the chain pitch being constant. Next, a uniform sprocket is selected which has a plurality of uniform teeth and uniform tooth gaps spaced about the periphery of the sprocket, one of each of the uniform tooth gaps is located between adjacent uniform teeth. Each of the uniform tooth gaps has a tooth gap radial location defined as a distance between the center of the uniform sprocket and a point located at the chain pin center of a fully seated link in a radial direction, each uniform tooth gap having the same tooth gap radial location. A pitch circle, having a radius defined as a distance between the center of the uniform sprocket and the central axis of a pin is drawn in one of the uniform tooth gaps. A uniform sprocket polygon is positioned inside the pitch circle, with every vertex of the polygon touching the pitch circle and each side of the polygon being equal to the chain pitch. A first random sprocket polygon is formed by altering the vertices between the sides of the uniform polygon while maintaining the length of each side. A first vertex angle is determined in a vertex of the first random polygon and a first supplementary angle of the first vertex angle. A second random sprocket polygon is formed that is different than the first random polygon, by altering the vertices between the sides of the uniform polygon while maintaining the length of each side. Next, a second vertex angle is determined in a vertex of the second random polygon and a second supplementary angle of the second vertex angle. A random sprocket is made having random teeth and random tooth gaps spaced about the periphery of the random sprocket. One of each of the random tooth gaps is located between adjacent random teeth. Each of the random tooth gaps has a tooth gap radial location defined as a distance between the center of the random sprocket and a point located at the chain pin center of a fully seated link in a radial direction. At least one set of four consecutive random tooth gaps is defined as a first tooth gap, a second tooth gap, a third tooth gap and a fourth tooth gap.

The first tooth gap and the fourth tooth gap have the same tooth gap radial location, and the second tooth gap and the third tooth gap have a different tooth gap radial location from each other and from the first and the fourth tooth gap. The set of four consecutive random tooth gaps has two different link angles. A first link angle is defined by an angle between a first link center line and a second link center line and the second link angle is defined as an angle between the second link center line and a third link center line. The first link center line is defined by the central axis of a pin in the first tooth gap and the central axis of a pin in the second tooth gap. The second link center line is defined by the central axis of a pin in the second tooth gap and the central axis of a pin in the third tooth gap. The third link center line is defined by the central axis of a pin in the third tooth gap and the central axis of a pin in the fourth tooth gap. One of the two different link angles is equal to the first supplementary angle and the second of the two different link angles is equal to the second supplementary angle.

Another method for making a sprocket includes: selecting a uniform chain having pins interconnected by links, each of the pins having a central axis and a chain pitch defined as a distance between the central axis of adjacent pins, the chain pitch being constant. A uniform sprocket is selected having a plurality of uniform teeth and uniform tooth gaps spaced about the periphery of the sprocket. One of each of the uniform tooth gaps is located between adjacent uniform teeth. Each of the uniform tooth gaps has a tooth gap radial location defined as a distance between the center of the uniform sprocket and a point located at the chain pin center of a fully seated link in a radial direction, each uniform tooth gap having the same tooth gap radial location. A uniform trapezoid is formed with a base having a length equal to the distance between a center of a pin in a first tooth gap and the center of a pin in a fourth uniform tooth gap of a set of four consecutive uniform tooth gaps of the uniform sprocket. The top and legs of the uniform trapezoid equal in length to the chain pitch. A quadrilateral is formed by moving vertices of the uniform trapezoid while maintaining the length of each side. A random sprocket is made having at least one set of four consecutive random tooth gaps by assigning each vertex of the quadrilateral to a center of one of four consecutive pins in the uniform chain and positioning the four consecutive pins in the four consecutive random tooth gaps.

Preferably, the two vertices of the trapezoid that form the ends of the base are not moved while the two vertices that form the ends of top of the trapezoid are moved.

In another embodiment, the sprocket of the present invention has a set of four consecutive random tooth gaps with a first tooth gap radial location and a fourth tooth gap radial location measuring the same, the second tooth gap radial location is less than the first tooth gap radial location and the third tooth gap radial location is greater than the first tooth gap radial location. Alternatively, the first and the fourth tooth gap radial locations are the same while the second tooth gap radial location is greater than the first tooth gap radial location and the third root radial location is less than the first root radial location.

The sprocket of the present invention can also have more than one set of the four consecutive random tooth gaps.

These and other aspects of the present invention may be more readily understood by reference to one or more of the following drawings.

BRIEF DESCRIPTION OF THE DRAWINGS

FIG. 2' illustrates in more detail the sprocket of the present invention for IT chains

FIG. 5 illustrates a sprocket with a plurality of non-uniform tooth gap patterns for roller and bush chaos; and FIG. 5' illustrates a sprocket with a plurality of non-uniform tooth gap patterns for IT chains.

DETAILED DESCRIPTION OF THE INVENTION

Figure 1:
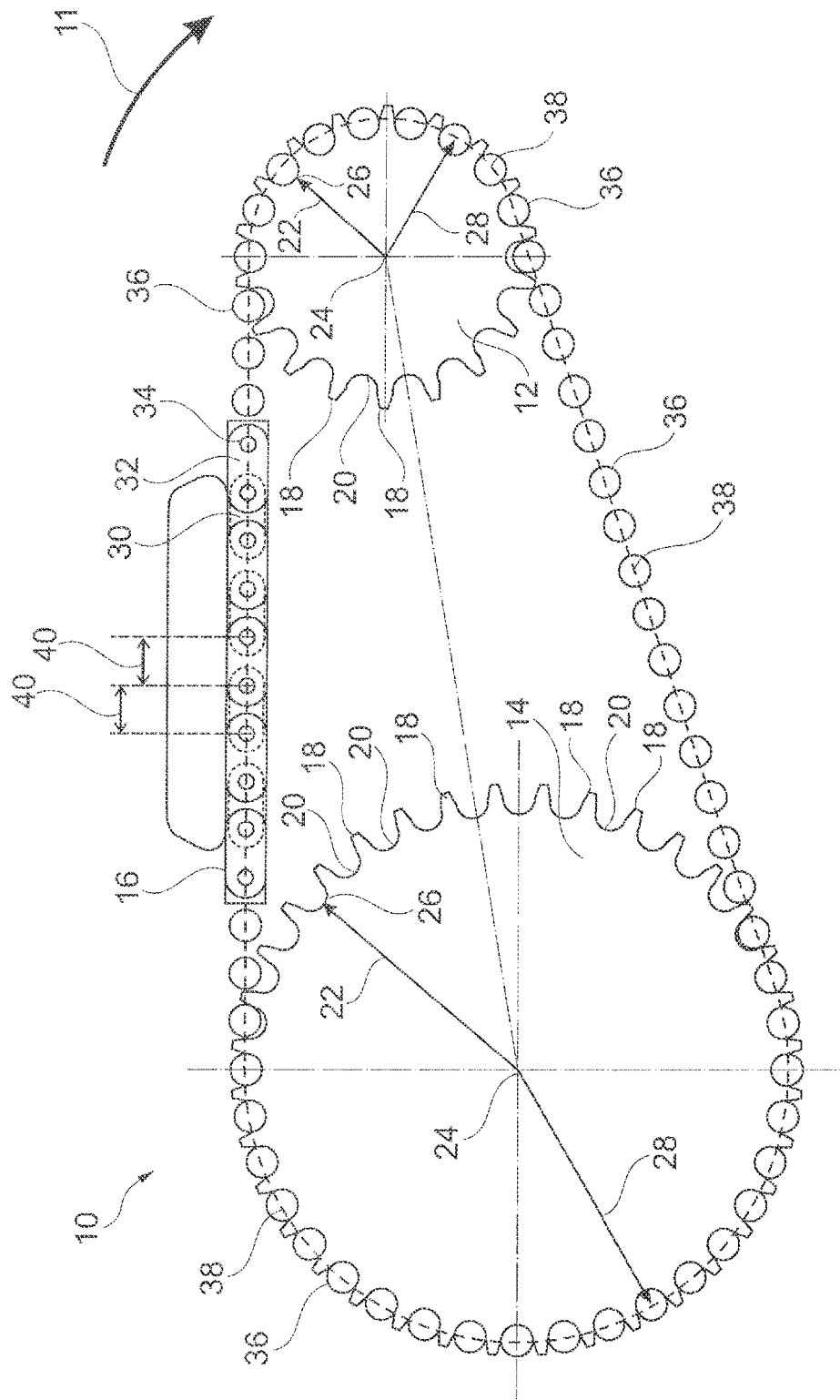
FIG. 1 illustrates the chain and sprocket drive assembly, including an example roller chain known in the art.

FIG. 1 illustrates a roller chain drive system 10 which is rotated in the direction of arrow 11. Roller chain drive system 10 has a drive sprocket 12, a driven sprocket 14, and miler chain 16 which interconnects the two sprockets.

Each sprocket 12 and 14 has sprocket teeth 18 positioned around the periphery of the sprocket. Between each of the sprocket teeth 18 is a tooth gap 20. Each tooth gap 20 has a tooth gap radial location 22 which is measured from center 24 of the sprocket to point 26 on the tooth gap closest to center 24. This point 26 can conventionally be defined as the bottom of tooth gap 20. Pitch radius 28 is defined as the distance between center 24 of the sprocket and center 38 of each roller 36 of chain 16 positioned in the tooth gap 20.

Chain 16 has inner links 30 and outer links 32 that interconnect rollers 36. The links are interconnected by bushings or pins 34. Rollers 36 are positioned between the links and are freely rotatable. Each roller 36 has a center of rotation 38 about which it rotates. Chain pitch 40 is a measurement between center 38 of adjacent rollers 36. In the present invention, chain 16 has uniform or constant chain pitch. In other words, the distance between center 38 of adjacent rollers 36 is constant on chain 16.

Figure 2:
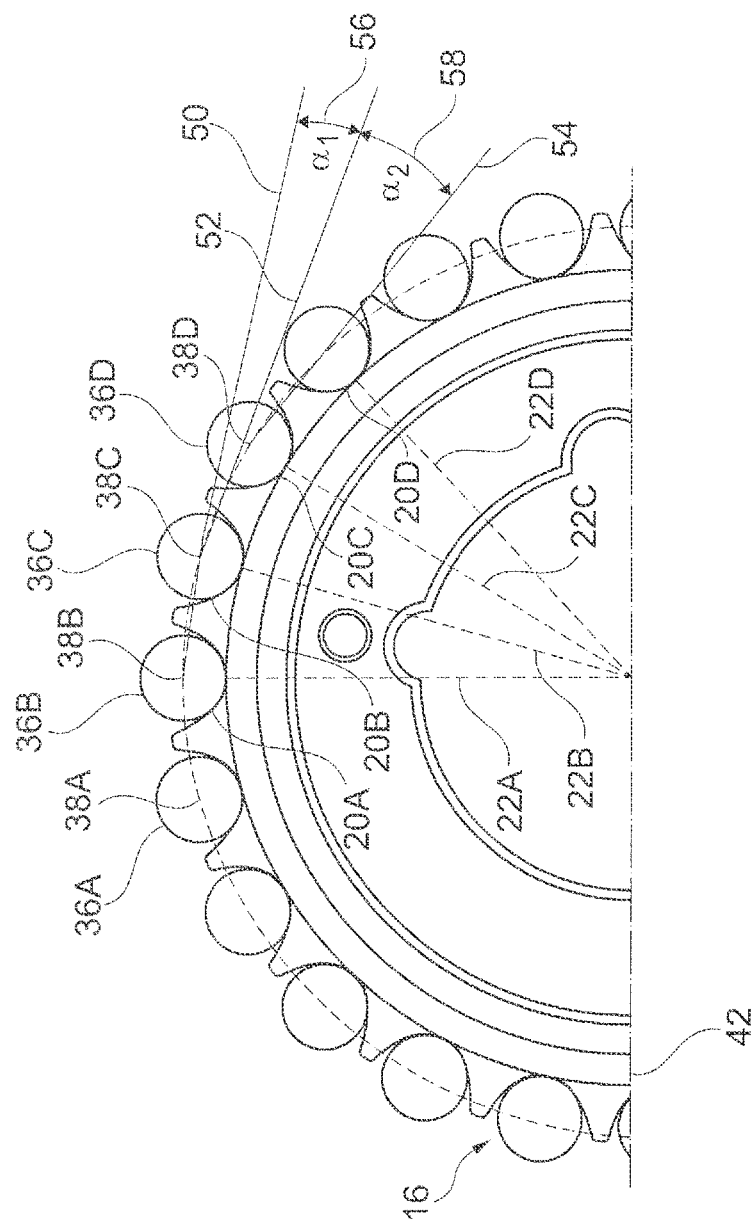
FIG. 2 illustrates in more detail the sprocket of the present invention for roller and bush chains.
Figure 2:
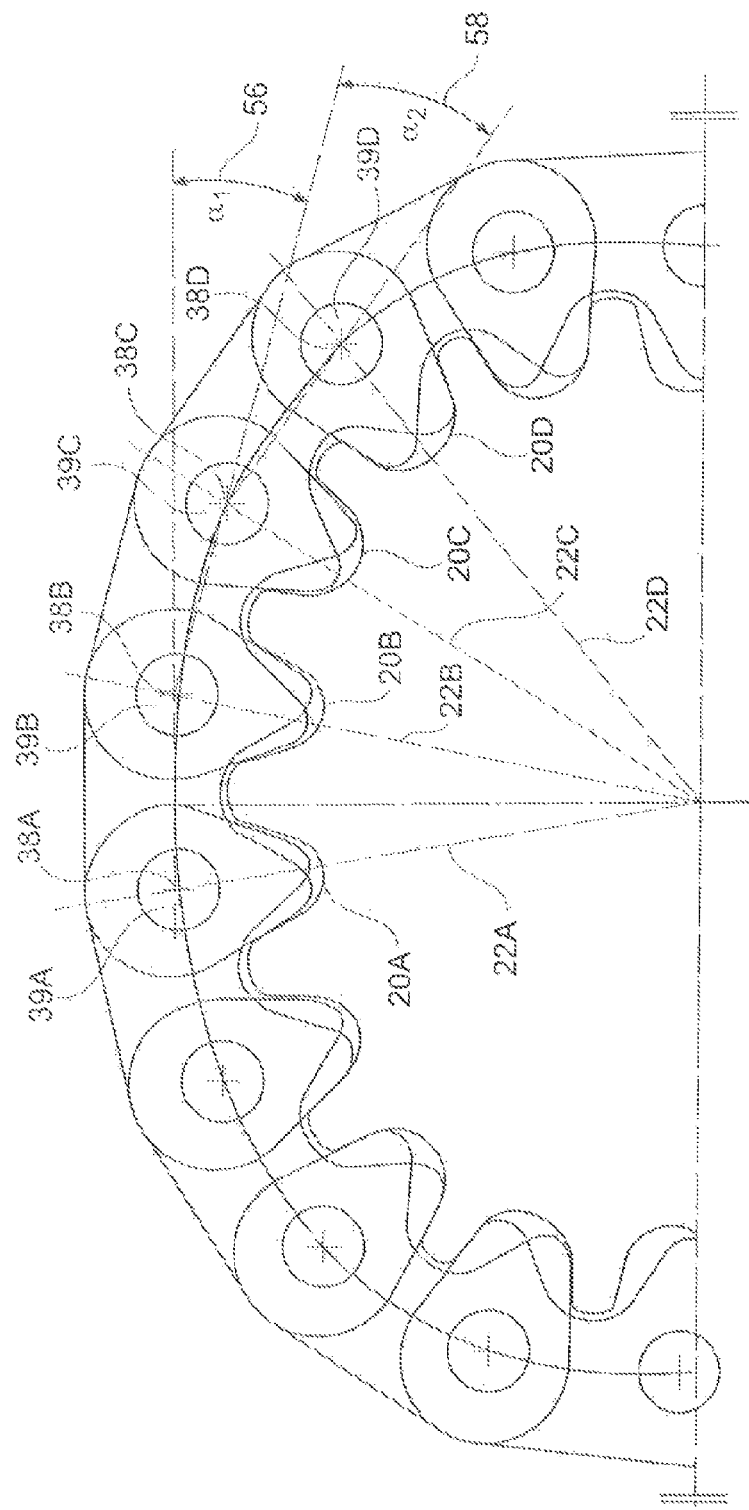

Turning to FIG. 2, FIG. 2 illustrates the four consecutive tooth gaps having different tooth gap radial locations and different link angles. Specifically, first tooth gap 20A is adjacent second tooth gap 20B, which in turn is adjacent to third tooth gap 20C which in turn is adjacent to fourth tooth gap 20D. Each tooth gap 20A, 20B, 20C, and 20D have a respective tooth gap radial location labeled 22A, 22B, 22C, and 22D. Positioned in each tooth gap is a respective roller labeled 36A, 36B, 36C, and 36D. Each roller has a respective center labeled 38A, 38B, 38C, and 38D.

The link angles for the four consecutive tooth gaps 20A, 20B, 20C, and 20D are defined by first center line 50, second center line 52, and third center line 54. First center line 50 is defined by center 38A of roller 36A and center 388 of roller 368. Second center line 52 is defined by center 388 of roller 36B and center 38C of roller 36C. Third center line 54 is defined by center 38C of roller 36C and center 38D of roller 36D.

Two different link angles between the set of four consecutive roots is defined by arc 56 and angle α1 and arc 58 and angle α2. As can be seen link angle 56 is different than link angle 58.

It can also be seen that tooth gap radial location 22A and tooth gap radial location 22D are the same while tooth gap radial location 22B is less than tooth gap radial location 22A and 22D. Tooth gap radial location 22C is greater than tooth gap radial location 22A, 22B, and 22D.

Thus, a sprocket made in accordance with FIG. 2 has rollers 36 hitting respective tooth gaps 20 at different time intervals thereby breaking the noise and vibrations.

FIG. 2' shows the sprocket for an IT chain. The pins 39 replace the rollers 36 of FIG. 2. Otherwise, the basic concept of FIG. 2 applies equally to FIG. 2'.

Figure 3:
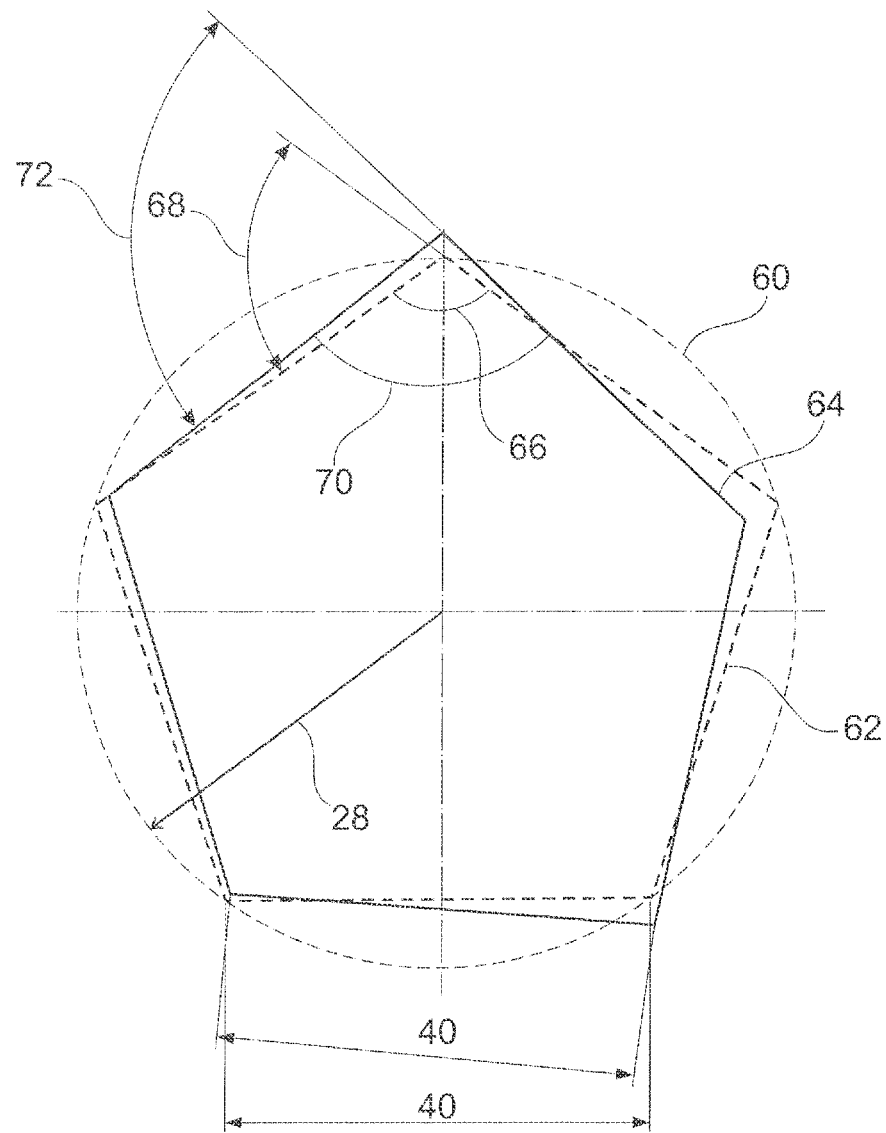
FIG. 3 illustrates the uniform and random polygon for designing the sprocket of the invention.

Turning to FIG. 3, FIG. 3 illustrates a method for determining the different link angles to be used for the set of four consecutive tooth gaps. Pitch circle 60 has a radius 28 which is equal to the pitch radius of a desired sprocket Inside of pitch circle 60 is drawn a uniform sprocket polygon 62 having each side equal in length to chain pitch 40. Uniform sprocket polygon 62 has a vertex angle 66 and a supplementary angle 68. Supplementary angle 68 equals the link angle and the link angle of this uniform sprocket has uniform tooth gap radial locations 22.

In order to arrive at random root radial locations for designing of the sprocket of the invention, the uniform sprocket polygon is shifted to provide random sprocket polygon 64. Random sprocket polygon 64 has the same side walk as uniform sprocket 62, i.e. each side of random sprocket 64 has a length equal to chain pitch 40. In order to determine link angles for the random sprocket, supplementary random angle 72 is determined from vertex angle 70 of random polygon 64. By altering uniform sprocket polygon 62 twice, in different manners, two different link angles can be arrived at and these link angles can then be used for forming link angles 56 and 58 of FIG. 2.

It will be understood that in altering the polygon to form random polygon 64, the sprocket must be properly designed so that rollers fully seat in every root and that edges have equal lengths and the length being equal to the chain pitch so as to use a chain with constant chain pitch. By ensuring that this is met, proper chain meshing will be achieved during full sprocket rotation.

Figure 4:
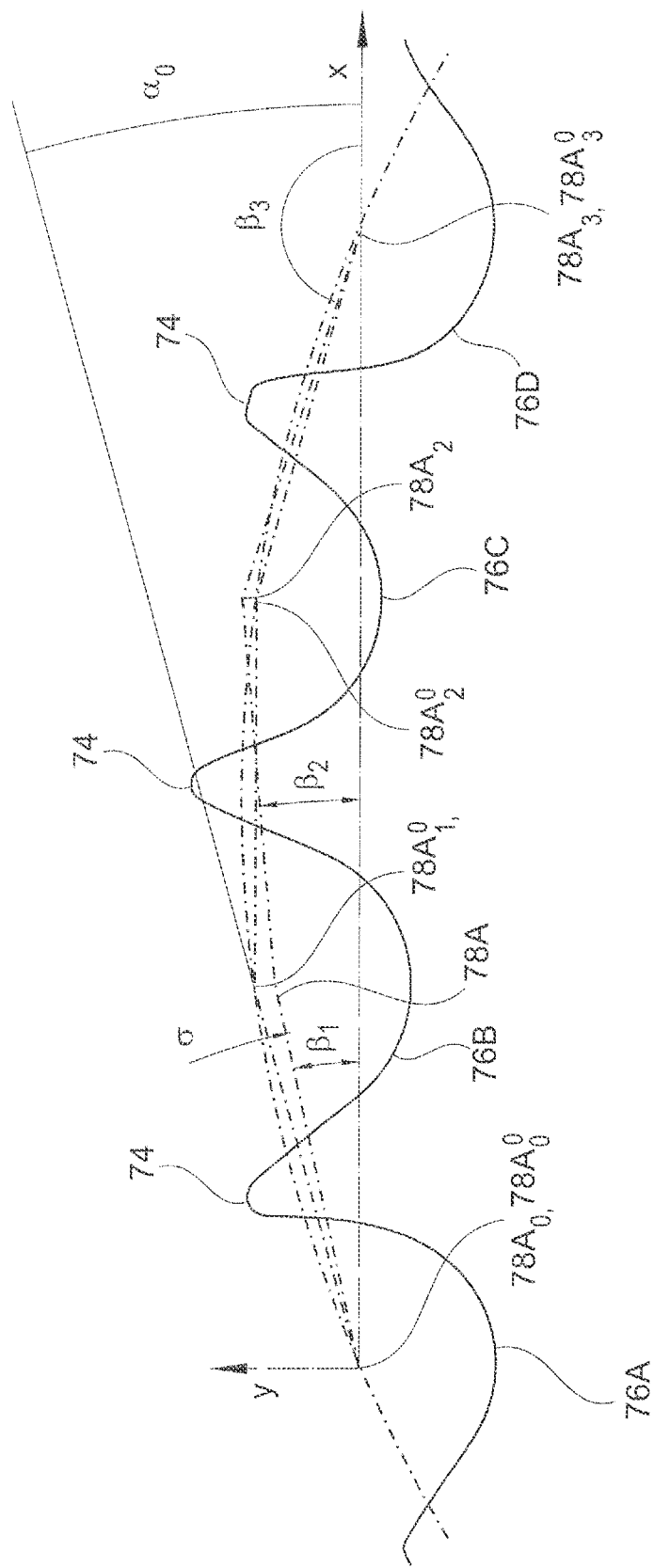
FIG. 4 illustrates the preferred method for making the sprocket using a trapezoid.

FIG. 4 illustrates the preferred method for making a random sprocket. FIG. 4 illustrates a portion of a sprocket with teeth 74 and four consecutive roots 76A, 76B, 76C, and 76D. For a uniform sprocket, the center of rotation $78A^°_0$, $78A^°_1$, $78A^°_2$, and $78A^°_3$ is shown for each roller. A uniform trapezoid has the vertices $78A^°_0$, $78A^°_1$, $78A^°_2$, $78A^°_3$ with base $78A^°_0$-$78A^°_3$, top $78A^°_1$-$78A^°_2$, and sides or legs $78A^°_0$-$78A^°_1$ and $78A^°_2$-$78A^°_3$. Base $78A^°_0$-$78A^°_3$ is parallel to top $78A^°_1$-$78A^°_2$. To form a set of four consecutive tooth gaps with non-uniform tooth gaps and a sprocket with non-uniform tooth gaps, the vertex $78A^°_1$ is moved to $78A_1$ and the vertex $78A^°_2$ is moved to $78A_2$. Vertices $78A^°_0$ and $78A^°_3$ remain fixed. Thus a quadrilateral is formed and labeled $78A_0$, $78A_1$, $78A_2$, and $78A_3$. The vertices of quadrilateral $78A_0$, $78A_1$, $78A_2$, and $78A_3$ define the new center of rotation for rollers in tooth gaps 76A, 76B, 76C, and 76D. Since the rollers have the same diameters, the tooth gap radial location for tooth gaps 766 and 76C change to accommodate the new centers $78A_1$ and $78A_2$.

In forming the quadrilateral the length of the top, base and sides of the trapezoid are maintained, only the angle at the vertices is varied.

Mathematically, the non-uniform pattern of the rollers illustrated in FIG. 4 can be determined in such a way that the following equations are met:

$$\alpha_0 = 360°/z$$

$\alpha_0$ is the angle shown in FIG. 4
z is the number of teeth on the sprocket $$0.5° \leq \delta \leq 5°$$

δ=deviation angle of the leg as shown in FIG. 4.

$$\beta_1 = \alpha_0 - \delta$$

$\beta_1$=angle shown in FIG. 4

$$\sum_{i=1}^{3} \cos\beta i = 1 + 2(\cos\alpha_0)$$

$$\sum_{i=1}^{3} \sin\beta i = 0$$

FIG. 5 illustrates a non-uniform sprocket 80 with rollers 82, a plurality of non-uniform patterns, labeled Patterns 1, 2, and 3, repeated several times at different locations around the periphery of sprocket 80. Each pattern is different with the non-uniform tooth gap radial locations arrived at using the methods of the invention. The x's mark roller centers which are not uniform, away from pitch circle 84. The centers marked with a solid circle are rollers 82 with centers of rotation on pitch circle 84. Uniform patterns are shown where rollers 82 have a center of rotation on pitch circle 84.

Preferably Patterns 1, 2, and 3 are different, however, they can be the same.

FIG. 5' shows an IT chain sprocket with a number of non-uniform tooth gap patterns. In this embodiment a uniform tooth pattern is also provided, but is not mandatory. The centers of the tooth pins are indicated with a "x". The patterns are determined based on the methods described in the present application.

As will be understood, an infinite number of random sprocket configurations can be created by using the methods of the present invention due to the non-uniform impact intervals that are obtained. The fundamental meshing harmonic vibration component is lower than the uniform sprocket.

The embodiment shown in FIG. 2 is a specific embodiment of the present invention in that the first and the last tooth gaps are left at a uniform or the same tooth gap radial location while the second tooth gap is moved farther away from the uniform location in such a manner that it corresponds to a fully seated chain roller moving along an arc that has a radius equal to the chain pitch and centered on the center of the first tooth gap fully seated chain roller while the third tooth gap is moved more accordingly in order to maintain a uniform linear distance between the corresponding fully seated chain roller.

A trapezoid, also known as a trapezium, is a quadrilateral with two parallel sides of different length. The longer of two parallel sides is the base and the shorter of the two parallel sides is the top. As will be appreciated, in the uniform sprocket, the trapezoid is an isosceles trapezoid.

The figures were chosen for illustration purposes only and are not intended to limit the invention claimed herein.

LIST OF REFERENCE SYMBOLS 10 chain roller drive system
11 arrow direction
12 drive sprocket
14 driven sprocket
16 roller chain
18 sprocket teeth
20 tooth gaps
20A first tooth gap
20B second tooth gap
20C third tooth gap
20D fourth tooth gap
22 tooth gap radial location
22A first tooth gap radial location
22B second tooth gap radial location
22C third tooth gap radial location
22D fourth tooth gap radial location
24 center of sprocket
26 point on root closest to center, bottom of root
28 pitch radius
30 inner links
32 outer links
34 pin
36 rollers
36A first rollers
36B second rollers
36C third rollers
36D fourth rollers
38 center of rotation of roller
39 pins
40 chain pitch
42 sprocket
50 first center line
52 second center line
54 third center line
56 link angle α1
58 link angle α2
60 pitch circle
62 uniform sprocket polygon
64 random sprocket polygon
66 vertex angle uniform polygon
68 supplementary angle uniform polygon
70 vertex angle random polygon
72 supplementary angle random polygon
74 teeth
76 tooth gaps
78 roller centers
80 non-uniform sprocket
82 rollers
84 pitch circle

The invention claimed is:

1. A method for making a sprocket with reduced noise and vibration for a chain and sprocket drive comprising:
selecting a uniform chain having pins interconnected by links, each of the pins having a central axis and a chain pitch defined as a distance between the central axis of adjacent pins, the chain pitch being constant;
selecting a uniform sprocket having a plurality of uniform teeth and uniform tooth gaps spaced about the periphery of the sprocket, each of the uniform tooth gaps being located between adjacent uniform teeth, each of the uniform tooth gaps having a tooth gap radial location defined as a distance between the center of the uniform sprocket and a point along the uniform tooth gap closest to the center of the uniform sprocket in a radial direction, each uniform tooth gap having the same tooth gap radial location;
forming a uniform trapezoid with a base having a length equal to the distance between a center of a pin in a first uniform tooth gap and the center of a pin in a fourth uniform tooth gap of a set of four consecutive uniform tooth gaps of the uniform sprocket, the top and legs of the uniform trapezoid being equal in length to the chain pitch;
forming a quadrilateral by moving vertices of the uniform trapezoid while maintaining the length of each side; and
making a random sprocket having at least one set of four consecutive random tooth gaps by assigning each vertex of the quadrilateral to a center of one of four consecutive pins in the uniform chain and positioning the four consecutive pins in the four consecutive random tooth gaps.

2. The method of claim 1, wherein
in forming the quadrilateral, the vertices of the base of he trapezoid are not moved while the vertices of the top are moved.

3. The method of claim 1, wherein
the chain has a roller-type chain configuration.

4. The method of claim 1, wherein
the chain has an inverted tooth-type chain configuration.

5. The method of claim 1, wherein
the chain has a bush-type chain configuration.

* * * * *